United States Patent
Lee et al.

(10) Patent No.: US 7,386,234 B2
(45) Date of Patent: Jun. 10, 2008

(54) APPARATUS FOR REMOTELY DETERMINING FAULT OF SUBSCRIBER TERMINALS AND METHOD THEREOF

(75) Inventors: Byung Tak Lee, Kyungki-do (KR); Mun Seob Lee, Daejeon (KR); Hyun Seo Kang, Gwangjoo (KR); Jai Sang Koh, Gwangjoo (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 471 days.

(21) Appl. No.: 11/098,701

(22) Filed: Apr. 5, 2005

(65) Prior Publication Data

US 2006/0051088 A1    Mar. 9, 2006

(30) Foreign Application Priority Data

Sep. 2, 2004    (KR) .................... 10-2004-0069987

(51) Int. Cl.
*H04B 10/08* (2006.01)
*H04J 14/00* (2006.01)

(52) U.S. Cl. .................... 398/67; 398/72; 398/33; 398/31; 398/17; 398/16

(58) Field of Classification Search ............ 398/13–16, 398/9, 10, 17, 20, 31, 33, 66–69, 71, 72
See application file for complete search history.

(56) References Cited

U.S. PATENT DOCUMENTS

| | | | |
|---|---|---|---|
| 5,907,417 A * | 5/1999 | Darcie et al. .................. | 398/20 |
| 6,108,112 A * | 8/2000 | Touma .......................... | 398/10 |
| 6,396,575 B1 | 5/2002 | Holland et al. | |
| 7,075,712 B2 * | 7/2006 | Kinoshita et al. ........... | 359/349 |
| 7,162,731 B2 * | 1/2007 | Reidhead et al. ........... | 725/107 |

OTHER PUBLICATIONS

Izumi Sankawa, et al.; "Fault Location Technique for In-Service Branched Optical Fiber Networks"; IEEE Photonics Technology Letters, vol. 2, No. 10, Oct. 1990; pp. 766-768.
Robert M. Grow, et al.; IEEE Draft P802.3ah™/D3.0; Draft Amendment to Carrier Sense Multiple Access with Collision Detection (CSMA/CD) access method and physical layer specifications; Draft amendment to—Infornmation technology—Telecommunications and information exchange between systems—Local and metropolitan area networks—Specific requirements—Part 3: Carrier sense multiple access with collision detection (CSMA/CD) access method and physical layer specifications—Media Access Control Parameters, Physical Laters and Management Parameters for subscriber access netoworks; pp. 1-606; Oct. 7, 2003.

* cited by examiner

*Primary Examiner*—Dalzid Singh
(74) *Attorney, Agent, or Firm*—Lowe Hauptman Ham & Berner LLP

(57) ABSTRACT

An apparatus for remotely determining a fault of subscriber terminals and a method thereof, and more specifically, an apparatus by which in a passive optical network (PON) system, a central office determines a remote fault of subscriber terminals, and a method thereof are provided. The apparatus for determining a remote fault of subscriber terminals includes: a frequency analysis unit recognizing a fault occurrence of a subscriber terminal from an upstream signal and analyzing the frequency spectrum of the upstream signal; and a fault determination unit selecting a specific frequency corresponding to the shape of the spectrum, determining a diagnosis signal corresponding to the specific frequency, transmitting a message requesting to upward transmit the diagnosis signal to each ONT, finding a peak frequency from the frequency spectrum of the diagnosis signal transmitted by the ONT, determining a fault of the subscriber terminal by comparing the peak frequency with the selected specific frequency.

4 Claims, 3 Drawing Sheets

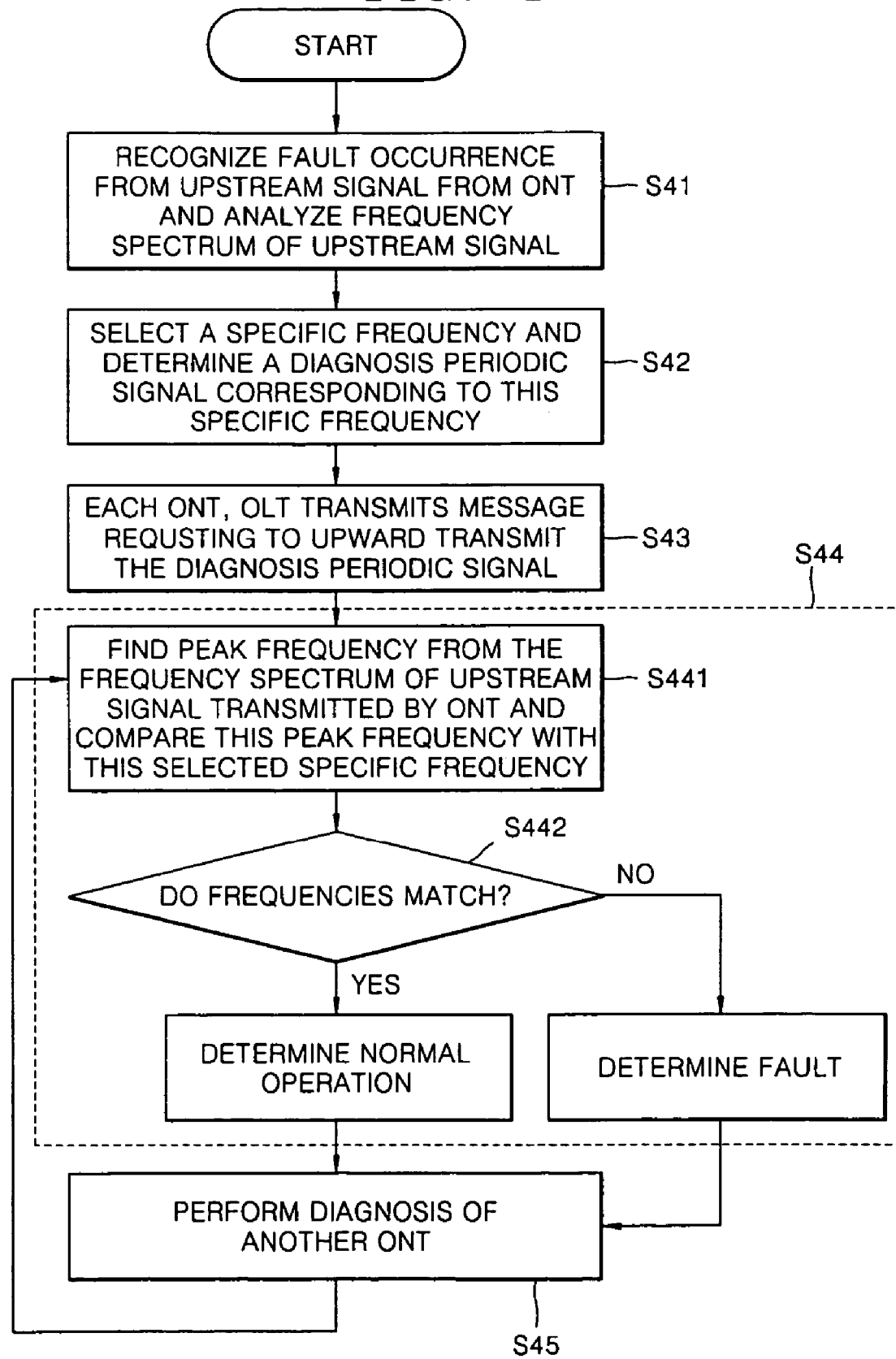

APPARATUS FOR REMOTELY DETERMINING FAULT OF SUBSCRIBER TERMINALS AND METHOD THEREOF

BACKGROUND OF THE INVENTION

This application claims the priority of Korean Patent Application No. 10-2004-0069987, filed on Sep. 2, 2004, in the Korean Intellectual Property Office, the disclosure of which is incorporated herein in its entirety by reference.

1. Field of the Invention

The present invention relates to an apparatus for remotely determining a fault of subscriber terminals and a method thereof, and more particularly, to an apparatus by which in a passive optical network (hereinafter referred to as a "PON") system, a central office remotely determines a fault of subscriber terminals, and a method thereof.

2. Description of the Related Art

A PON system has a structure in which an optical line terminal (OLT) 101 is located at a central office 10, and connected to a remote node (RN) 11 through optical fibers, and then, connected to the optical network terminal (ONT) 12 or an optical network user (ONU) terminal of each subscriber through optical fiber. At this time, when time division multiplexing (TDM) or sub-carrier multiplexing (SCM) is applied, an optical power splitter is used as an RN, and when wavelength division multiplexing is applied, an optical filter for WDM is used as an RN.

According to an employed communication protocol and network structure, the PON system is broken down into an Ethernet-PON, an ATM-PON, a WDM-PON, a G-PON, a Super-PON, and so on.

In a PON, since a subscriber terminal is located in a range reaching tens of kilometers away from a central office, it is needed to diagnose (determine) remotely whether there is a fault (failure) in a subscriber terminal. In a PON, multiple subscriber terminals share an upstream communication channel, and if any one terminal among the subscriber terminals goes out of order and upward transmits an abnormal signal outside the assigned time slot, other normal subscriber terminals cannot transmit a normal signal to the central office, either. In this case, there arises a problem that in order to identify the fault subscriber terminal, the network operators should examine each subscriber terminal scattered in a range reaching tens of kilometers.

In order to solve this problem, many methods have been suggested. As the examples, optical time domain reflectometry (OTDR) method (U.S. Pat. No. 6,396,575) and an Operation & Administration & Management (OAM) protocol have been known.

The OTDR is a method by which after a central office transmits a short pulse through an optical line network, the back-scattered pulse (Rayleigh back-scattering) is analyzed to check whether there is a fault on the optical lines of the PON. This method has a limit that only whether or not there is a fault in optical lines is examined and a fault in a subscriber terminal cannot be examined.

The method using the OAM protocol is standardized in 2003 IEEE 802.3ah. In this method, by exchanging OAM protocol data unit (OAMPDU) packets capable of performing the OAM function between the central office and subscriber terminals, it is examined whether or not there is a fault in a subscriber terminal.

However, this method cannot be used when the exchanges of normal OAMPDU packets are impossible due to the serious fault situation, for an example, the assigned-time-slot violation cases.

SUMMARY OF THE INVENTION

The present invention provides an apparatus by which in a passive optical network (PON) system, a central office remotely determines a fault of subscriber terminals, and a method thereof.

According to an aspect of the present invention, there is provided an apparatus for determining remotely a fault subscriber terminal including: a frequency analysis unit recognizing a fault occurrence of a subscriber terminal from an upstream signal and analyzing the frequency spectrum of the upstream signal; and a fault determination unit selecting a specific frequency corresponding to the shape of the spectrum, determining a diagnosis signal corresponding to the specific frequency, transmitting a message requesting to upward transmit the diagnosis signal to each ONT, finding a peak frequency from the frequency spectrum of the diagnosis signal transmitted by the ONT, determining a fault of the subscriber terminal by comparing the peak frequency with the selected specific frequency.

According to another aspect of the present invention, there is provided a method for determining a remote fault of subscriber terminals including: recognizing a fault occurrence of a subscriber terminal from an upstream signal; analyzing the frequency spectrum of the upstream signal; selecting a specific frequency corresponding to the shape of the spectrum; determining a diagnosis signal corresponding to the specific frequency; transmitting a message requesting to upward transmit the diagnosis signal to each ONT; finding a peak frequency from the frequency spectrum of the diagnosis signal transmitted by the ONT; and determining a fault of the subscriber terminal by comparing the peak frequency with the selected specific frequency.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart of the operations performed by an embodiment of a method according to the present invention.

DETAILED DESCRIPTION OF THE INVENTION

Figure 1:
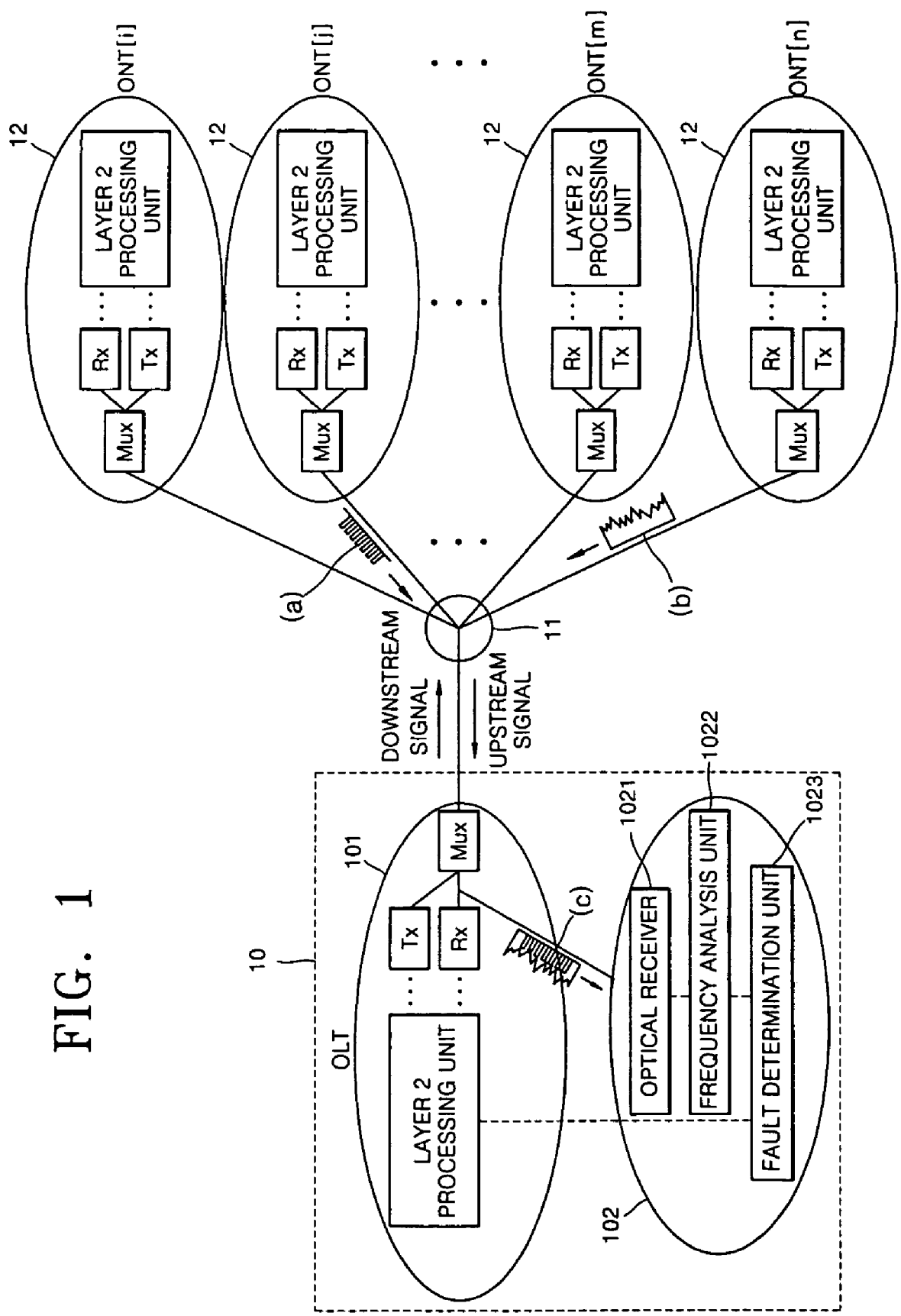
FIG. 1 is a diagram showing the structure of a passive optical network (PON) having an apparatus according to the present invention.

The present invention provides an apparatus enabling remote diagnosis of a fault in a subscriber terminal at a central office, regardless of occurrence of critical errors in subscriber terminals, and a method thereof.

The technological idea provided by the present invention is that a central office performs frequency analysis of the periodic signal that is upward transmitted by a subscriber terminal to the central office, and determines whether the subscriber terminal operates normally or abnormally by checking the peak frequency of the upstream signal. Also, while the conventional methods can be regarded as performing a data link layer level diagnosis, the present invention can be regarded as performing a physical layer level diagnosis because it performs frequency analysis.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. In the drawings, whenever the same element reappears in subsequent drawings, it is denoted by the same reference numeral.

FIG. 1 is a diagram showing the structure of a passive optical network (PON) having an apparatus enabling diagnosis of a fault in a subscriber terminal according to the present invention.

In a central office 10, an OLT 101 is located and linked to ONTs[i] through [n] 12 or ONUs of subscribers, that is, user terminals, through optical fiber via an RN 11. Mux indicates an optical filter separating wavelengths of an upstream signal and a downstream signal, Tx indicates an optical transmitter and Rx indicates an optical receiver. A layer 2 processing unit receives an electric signal at a physical layer and performs signal processing at a data link layer.

Specific operations of the present invention will now be explained in detail with reference to FIGS. 1 through 4.

It is assumed that ONT[n] among subscriber terminals malfunctions and upward transmits an abnormal signal outside the assigned time slot. The OLT 101 located in the central office 10 transmits a message requesting to upward transmit a signal for diagnosing a fault, to each subscriber terminal ONTs (ONTs[i] through [n] in the present embodiment) individually.

Figure 2:
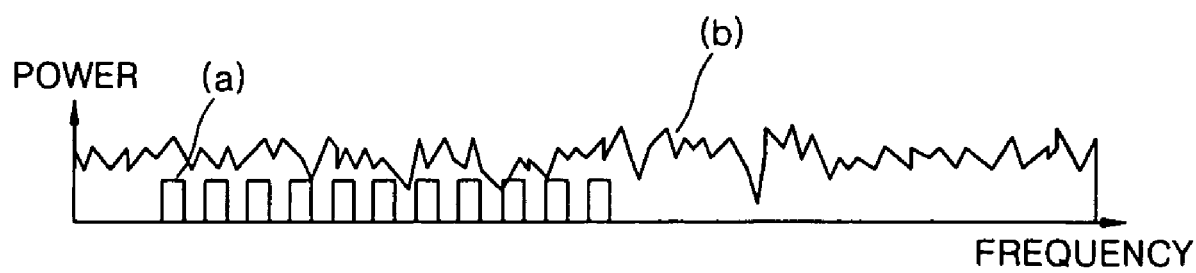
FIG. 2 is a diagram showing an example of an upstream signal input to an apparatus according to the present invention.

In FIG. 1, (A) indicates a signal for diagnosing a fault in a subscriber terminal that is an object of diagnosis, (B) indicates an abnormal signal of a subscriber terminal malfunctioning, and (C) indicates a mixed upstream signal of the periodic signal and the abnormal signal. FIG. 2 show an example of an upstream signal observed in the OLT 101. At this time, (A) is expressed as a predetermined periodic signal as shown in FIGS. 1 and 2, and (B) is expressed as an abnormal signal as shown in FIGS. 1 and 2.

In the OLT receiving unit (Rx) of the central office, the upstream signal (C) is made by mixing the periodic signal (A) with abnormal signal (B), as shown in FIG. 2. So, correct digital transmissions cannot be performed. For this reason, the conventional methods performing diagnosis at a data link layer level cannot perform normally and remotely fault determination of a subscriber terminal.

In order to solve the problem of the conventional methods described above, the present invention adds a remote fault determination unit 102 in the central office 10 such that the problem is solved. The remote fault determination unit 102 is formed with an optical receiver 1021, a frequency analysis unit 1022, and a fault determination unit 1023 as shown in FIG. 1.

Figure 3:
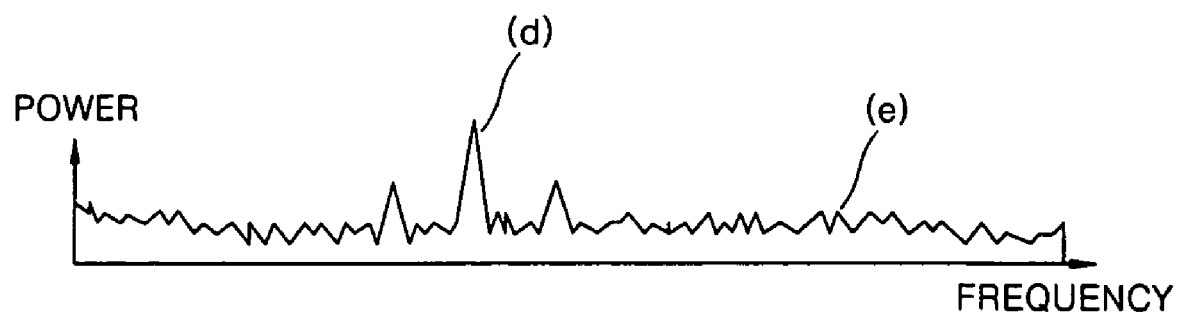
FIG. 3 is a diagram showing an example of a frequency spectrum input to an apparatus according to the present invention.

The optical receiver 1021 performs opto-electronic conversion, and preferably is an optical receiver optimized to an analog optical signal. The frequency analysis unit 1022 analyzes the frequency spectrum of the upstream signal converted into an electric signal. In the analyzed frequency spectrum, a peak frequency (D) by the periodic signal (A) and a random frequency spectrum (E) by the abnormal signal (B) appear as shown in FIG. 3.

By determining whether or not the peak frequency (D) corresponds to a specific frequency, the fault determination unit 1023 determines whether the subscriber terminal being diagnosed is normal.

FIG. 4 is a flowchart of the operations performed by an embodiment of a method according to the present invention.

The OLT 101 located in the central office 10 recognizes from an upstream signal that there is an error, and begins to identify a malfunctioning subscriber terminal.

The upstream signal (C) is opto-electronic converted through the optical receiver 1021, and the frequency analysis unit 1022 analyzes the frequency spectrum of the upstream signal (C) in operation S41. The analysis of the frequency spectrum can be performed by using a fast Fourier transform (FFT) module or a frequency filter.

The fault determination unit 1023 selects a specific frequency in consideration of the upstream spectrum shape, and determines a signal for diagnosing a fault corresponding to this selected specific frequency and, as an example, can determine a predetermined periodic signal form as shown in FIG. 2. For example, if 1 MHz is selected as the specific frequency, by considering the transmission speed and coding technique, the corresponding periodic signal is determined as "A0000 A0000 . . . A0000" so that the final line bitrate can be 1 Mbps(or a multiple of 1 Mbps). At this time, in determining the specific frequency and the corresponding periodic signal for diagnosis, the frequency can be time constant or time varying, it is preferable to set as time varying for the diagnosis performance improvement.

Next, the fault determination unit 1023 transmits through the OLT 101 a message requesting to upward transmit a signal for diagnosis (a predetermined periodic signal in the present embodiment), to each subscriber terminal ONTs (ONTs[i] through [n] in the present embodiment) linked to the fault determination unit 1023 as described above in operation S43. More specifically, the layer 2 processing unit of the OLT 101 in conjunction with the fault determination unit 1023 transmits a message requesting to upward transmit the determined periodic signal, to each ONT 12 that is the object of diagnosis. Each ONT 12 that is the object of diagnosis transmits the predetermined periodic signal, for example, character strings such as "A0000 A0000 . . . A0000" and the line bitrate corresponding to this is 1 Mbps.

Next, the remote fault determination unit 102 determines whether or not an ONT malfunctions in operation S44. By analyzing the frequency spectrum of the upstream signal, the frequency analysis unit 1022 finds a peak frequency (D), and compares this with the selected specific frequency in operation S441.

It is determined whether or not the measured peak frequency corresponds with the selected specific frequency in operation S442. If the frequencies match, it is determined that the subscriber terminal which is the object of diagnosis is a normal operating terminal, and if the frequencies do not match, it is determined that the subscriber terminal malfunctions. According to the above example, if the peak frequency is measured as 1 MHz, the corresponding ONT is determined as a normal subscriber terminal, or else the ONT is determined as a malfunctioning subscriber terminal. This determination of a fault is performed individually in each subscriber terminals in operation S45.

Thus, in the embodiment according to the present invention, the OLT located in the central office makes subscriber terminal ONTs upward transmit a predetermined periodic signal, and by analyzing the frequency spectrum of the upward transmitted signal, the remote fault determination unit 102 located in the central office determines whether or not there is a specific peak frequency. By doing so, whether a subscriber terminal operates normally or abnormally is determined simply through a remote fault determination.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the present invention, the following effects can be obtained.

Since the diagnosis is based on the frequency analysis, a simple and powerful diagnosis at a physical layer is enabled. Each subscriber terminal does not need to a have an additional hardware module, which leads to cost reduction. The present invention can be used without modifying the conventional standardized communication protocols of the PON system. Since diagnosis at a physical layer level is enabled, even in a situation with a serious error of a subscriber terminal, remote fault determination of the subscriber terminal is enabled.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for determining a remote fault of an optical network terminal (ONT) comprising:

a frequency analysis unit configured to recognize a fault occurrence of an ONT based upon frequency spectrum analysis of a signal upwardly transmitted by the ONT; and a fault determination unit configured to:

select a specific frequency corresponding to the shape of the frequency spectrum of the signal upwardly transmitted by the ONT, determine a diagnosis signal corresponding to the specific frequency, transmit to each ONT a message requesting the ONT to upward transmit the diagnosis signal, find a peak frequency from the frequency spectrum of the diagnosis signal transmitted by the ONT, and determine a fault of the ONT by comparing the peak frequency with the selected specific frequency.

2. The apparatus of claim 1, wherein the specific frequency and the diagnosis signal are set as time constant or time varying.

3. A method for determining a remote fault of an optical network terminal (ONT) comprising:

recognizing a fault occurrence of an ONT from an upstream signal;

analyzing the frequency spectrum of the upstream signal;

selecting a specific frequency corresponding to the shape of the spectrum;

determining a diagnosis signal corresponding to the specific frequency;

transmitting a message requesting each ONT to upward transmit the diagnosis signal periodically;

finding a peak frequency from the frequency spectrum of the diagnosis signal transmitted periodically by the ONT; and determining a fault of the subscriber terminal by comparing the peak frequency with the selected specific frequency.

4. The method of claim 3, wherein the specific frequency and the diagnosis signal are set as time constant or time varying.

* * * * *